(12) United States Patent
Kakutani

(10) Patent No.: US 6,731,401 B1
(45) Date of Patent: *May 4, 2004

(54) PRINTING SYSTEM HAVING A PLURALITY OF STORAGE BUFFERS HAVING A TOTAL CAPACITY, CORRESPONDING TO THE NUMBER OF PIXELS IN ONLY ONE SCANNING LINE

(75) Inventor: Toshiaki Kakutani, Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,434
(22) Filed: Nov. 6, 1997
(30) Foreign Application Priority Data
Nov. 7, 1996 (JP) ............................................. 8-312998
(51) Int. Cl.⁷ ............................................... G06K 15/00
(52) U.S. Cl. ....................................... 358/1.9; 358/1.16
(58) Field of Search ................................ 395/109, 104, 395/101; 382/252, 237, 270; 358/534, 535, 536, 456, 457, 458, 459, 460, 298, 1.16, 1.9, 1.4, 1.1

(56) References Cited

U.S. PATENT DOCUMENTS 5,208,684 A * 5/1993 Itoh ........................... 358/456
5,463,478 A * 10/1995 Makita et al. ............... 358/455
5,748,785 A * 5/1998 Mantell et al. .............. 382/237
5,823,690 A * 10/1998 Narushima et al. .... 400/120.07
5,833,743 A * 11/1998 Elwakil ................... 106/31.27

FOREIGN PATENT DOCUMENTS

JP 2-31561 2/1990
JP 8-258252 10/1996

* cited by examiner

Primary Examiner—Gabriel Garcia
(74) Attorney, Agent, or Firm—Oblon, Spivak, McClelland, Maier & Neustadt, P.C.

(57) ABSTRACT

A printing system of the present invention, which determines the on/off state of dots by the error diffusion technique and expresses the tone of an image as a distribution of dots, has a memory of reduced capacity for storing distributed density errors. Whereas the prior art structure requires buffers for at least two lines in a scanning direction in order to distribute the density error to the peripheral pixels, the structure of the present invention requires such buffers only for one line. The printing system of the present invention adds a cumulative density error distributed from the processed peripheral pixels to input data regarding a target pixel so as to yield corrected data CorD(x) with respect to the target pixel, and compares the corrected data CorD(x) with a predetermined threshold value THL in order to determine whether or not a dot should be formed in the target pixel. The printing system then determines a density error errT in the case of formation of dot and in the case of non-formation of dot, and distributes the density error errT into the peripheral pixels with predetermined weights. The density errors allocated to the pixels adjoining to the target pixel in a secondary scanning direction are registered not in new error diffusion buffers but in used error diffusion buffers, to which the distributed density errors with respect to the processed peripheral pixels have already been allocated. This structure significantly reduces the total capacity of the error diffusion buffers.

23 Claims, 11 Drawing Sheets

PRINTING SYSTEM HAVING A PLURALITY OF STORAGE BUFFERS HAVING A TOTAL CAPACITY, CORRESPONDING TO THE NUMBER OF PIXELS IN ONLY ONE SCANNING LINE

BACKGROUND OF THE INVENTION

1. Field of the Invention

The present invention relates to a printing system with a printing head that successively forms dots in a predetermined direction on a printing object and records multi-tone images through a distribution of dots based on the error diffusion technique. The present invention also pertains to an image recording method and a recording medium, on which image conversion programs used therefor are recorded.

2. Description of the Related Art

Color printers, in which a plurality of color inks are discharged from a printing head, are widely used as an output device of a computer that records a multi-color, multi-tone image processed by the computer. Several methods are applicable to print a multi-color, multi-tone image with three color inks, cyan, magenta, and yellow (CMY). One method is a technique adopted in the conventional printers. This technique expresses the tone of a printed image by the density of dots (frequency of appearance of dots per unit area) while fixing the size of dots formed on a sheet of paper by a spout of ink. Another method adjusts the diameter of dots formed on a sheet of paper, in order to vary the density of dots per unit area. A monochromatic ink (generally black) forms a gray-scaled image. In this case, the tone of the image is also expressed by the distribution of dots.

In any of the above techniques, tone information of an original image is expressed by the distribution of dots, that is, the on/off state of dots, so that density error is inevitable in each pixel unit. An error diffusion technique has accordingly been proposed to distribute the density error causing in each pixel into the peripheral pixels and thereby make the whole density of a resulting image close to that of the original image. Many of the currently available printing systems adopt the error diffusion technique for distribution of dots.

The printing system based on the error diffusion technique scans a printing head in a direction of width of paper (hereinafter referred to as the primary scanning direction), while feeding the paper in a direction perpendicular to the primary scanning direction (hereinafter referred to as the secondary scanning direction), so as to form dots. The range of error diffusion is generally in the vicinity of a target pixel, that is, a plurality of adjoining pixels in the primary scanning direction and a plurality of adjoining pixels in the secondary scanning direction, as shown in FIG. 12. The numerals allocated to the respective pixels shown in FIG. 12 denote weights added to the distributed density errors. The total of weights is equal to one.

The printing system based on the error diffusion technique inputs print data for one scanning line in the primary scanning direction into an input data line buffer, determines formation or non-formation of dots with respect to the input data of one scanning line according to the error diffusion technique, stores the results of determination in a result line buffer, and stores results of error diffusion into an error diffusion line buffer. Since the error diffusion is carried out for pixels on a certain scanning line and pixels on a next scanning line, the error diffusion line buffer should have the capacity corresponding to at least two scanning lines.

The reduction in diameter of printing dots increases the number of dots printed on one line. The increased number of dots increases the required capacities of the input data line buffer, the result line buffer, and the error diffusion line buffer. By way of example, an image is recorded at the density of 1440 dpi in the direction of width of A4-size paper (210 millimeter). In this case, almost 12 thousand dots are formed on each line. The required capacity of the error diffusion line buffer for a certain scanning line and a next scanning line with respect to four colors CMYK then amounts to 96 kilobyte.

SUMMARY OF THE INVENTION

One object of the present invention is thus to reduce the required capacity of a memory for the error diffusion processing in a printing system with a printing head that successively forms dots along scanning lines in a predetermined scanning direction on a printing object and records an image through a distribution of dots based on an error diffusion technique. The required capacity of the memory for the error diffusion processing substantially corresponds to only one scanning line.

Another object of the present invention is to provide an image recording method for carrying out the error diffusion processing with a memory of such reduced capacity and a recording medium on which image conversion programs used therefor are recorded.

At least part of the above and the other related objects is realized by a first printing system with a printing head that successively forms dots along scanning lines in a predetermined scanning direction on a printing object and records an image through a distribution of dots based on an error diffusion technique. The first printing system of the invention includes: input means for inputting print data including tone information regarding an image to be recorded by a pixel unit; a plurality of storage buffers having a total capacity corresponding to a number of pixels included in only one scanning line, each storage buffer storing a cumulative error allocated to each pixel according to the error diffusion technique; diffused error registration means for registering the cumulative error into each of the storage buffers; corrected tone data computing means for computing corrected tone data with respect to a target pixel that is subjected to determination of formation or non-formation of a dot, based on tone information of the print data regarding the target pixel and the cumulative error regarding the target pixel and being registered in a storage buffer corresponding to the target pixel; density error computing means for calculating a difference between a printing density corresponding to the corrected tone data and a printing density realized by formation or non-formation of a dot as a density error; error distribution determination means for determining distribution of the density error into non-processed peripheral pixels in the vicinity of the target pixel with predetermined weights; and storage control means for storing errors allocated to adjacent pixels after the target pixel on an identical scanning line in a primary scanning direction into storage buffers corresponding to the adjacent pixels after the target pixel, and storing errors allocated to pixels existing on a next scanning line at positions corresponding to the target pixel and preceding pixels before the target pixel in the primary scanning direction into storage buffers corresponding to the target pixel and the preceding pixels before the target pixel, based on the distribution of the density error determined by the error distribution determination means.

In a printing system with a printing head that successively forms dots along scanning lines in a predetermined scanning direction on a printing object, the present invention is also directed to a first method of recording an image through a distribution of dots based on an error diffusion technique. The first method includes the steps of:

(a) inputting print data including tone information regarding an image to be recorded by a pixel unit;

(b) storing a cumulative error allocated to each pixel according to the error diffusion technique into each of a plurality of storage buffers, the storage buffers having a total capacity corresponding to a number of pixels included in only one scanning line;

(c) computing corrected tone data with respect to a target pixel that is subjected to determination of formation or non-formation of a dot, based on tone information of the print data regarding the target pixel and the cumulative error regarding the target pixel and being registered in a storage buffer corresponding to the target pixel;

(d) calculating a difference between a printing density corresponding to the corrected tone data and a printing density realized by formation or non-formation of a dot as a density error;

(e) determining distribution of the density error into non-processed peripheral pixels in the vicinity of the target pixel with predetermined weights; and (f) storing errors allocated to adjacent pixels after the target pixel on an identical scanning line in a primary scanning direction into storage buffers corresponding to the adjacent pixels after the target pixel, and storing errors allocated to pixels existing on a next scanning line at positions corresponding to the target pixel and preceding pixels before the target pixel in the primary scanning direction into storage buffers corresponding to the target pixel and the preceding pixels before the target pixel, based on the distribution of the density error determined in the step (e).

In the first printing system and the first method of the present invention, the storage buffers have the total capacity corresponding to only one scanning line. The error diffusion technique is adopted to distribute the calculated density error into the peripheral pixels in the vicinity of a target pixel with predetermined weights. In the structure of the first printing system and the first method, based on the distribution of the density error, errors allocated to adjacent pixels after the target pixel on an identical scanning line in a primary scanning direction are stored into storage buffers corresponding to the adjacent pixels after the target pixel, whereas errors allocated to pixels existing on a next scanning line at positions corresponding to the target pixel and preceding pixels before the target pixel in the primary scanning direction are stored into storage buffers corresponding to the target pixel and the preceding pixels before the target pixel. This structure enables the error diffusion to be carried out with the storage buffers having the total capacity of one line.

At least part of the objects is also realized by a second printing system with a printing head that successively forms dots along scanning lines in a predetermined scanning direction on a printing object and records an image through a distribution of dots based on an error diffusion technique. The second printing system of the invention includes: a plurality of storage buffers having a total capacity corresponding to a number of pixels included in only one scanning line, each storage buffer storing a cumulative error allocated to each pixel according to the error diffusion technique; input means for inputting print data including tone information regarding an image to be recorded by a pixel unit; corrected tone data computing means for computing corrected tone data with respect to a target pixel that is subjected to determination of formation or non-formation of a dot, based on tone information the print data regarding the target pixel and the cumulative error regarding the target pixel and being registered in a storage buffer corresponding to the target pixel; dot formation determination means for determining whether or not a dot is formed in each pixel according to the error diffusion technique, based on the corrected tone data; density error computing means for calculating a difference between a printing density corresponding to the tone information and a printing density realized by formation or non-formation of a dot as a density error, based on the determination by the dot formation determination means; error distribution determination means for determining distribution of the density error into peripheral pixels in the vicinity of the target pixel with predetermined weights, the peripheral pixels including pixels after the target pixel on an identical scanningline in a primary scanning direction and pixels existing on a next scanning line; storage control means for storing errors allocated to the pixels existing on the next scanning line into storage buffers corresponding to pixels that have already been subjected to the determination by the dot formation determination means; and head driving means for driving the printing head to form dots, based on the determination by the dot formation determination means.

In a printing system with a printing head that successively forms dots in a predetermined direction on a printing object, the present invention is also directed to a second method of recording an image through a distribution of dots based on an error diffusion technique. The second method includes the steps of:

(a) storing a cumulative error allocated to each pixel according to the error diffusion technique into each of a plurality of storage buffers, the storage buffers having a total capacity corresponding to a number of pixels included in only one scanning line;

(b) inputting print data including tone information regarding an image to be recorded by a pixel unit;

(c) determining whether or not a dot is formed in each pixel according to the error diffusion technique, based on tone information of the print data regarding a target pixel and the cumulative error regarding the target pixel and being registered in a storage buffer corresponding to the target pixel;

(d) calculating a difference between a printing density corresponding to the tone information regarding the target pixel and a printing density realized by formation or non-formation of a dot as a density error, based on the determination in the step (c);

(e) determining distribution of the density error into peripheral pixels in the vicinity of the target pixel with predetermined weights, the peripheral pixels including pixels after the target pixel in the predetermined direction and pixels in another direction that intersects the predetermined direction;

(f) storing errors allocated to the pixels in the another direction into storage buffers corresponding to pixels that have already been subjected to the determination in the step (c); and (g) driving the printing head to form dots, based on the determination in the step (c).

In the second printing system and the second method of the present invention, when the error diffusion technique is adopted to distribute the calculated density error into the peripheral pixels in the vicinity of a target pixel with predetermined weights, errors allocated to pixels on a scanning line next to the specific scanning line including the target pixel are stored into the storage buffers corresponding to pixels that have already been subjected to the determination of formation or non-formation of dots. This structure also enables the input data of one line to be subjected to the error diffusion with the storage buffers having the total capacity of one line.

In the first and the second printing systems of the present invention, it is preferable that the error distribution determination means includes temporary storage means for temporarily storing errors with respect to at least one pixel existing on the next scanning line and being located after the target pixel in the primary scanning direction. This structure does not require a significant increase in total capacity of the storage buffers, even when the error is distributed into the pixels existing on the next scanning line and being located after the target pixel in the primary scanning direction.

In accordance with one preferable application, the printing head forms at least two different dots by at least two different inks having different hues, and the error diffusion technique is applied to at least one of the different dots formed by the different inks having differet hues. This structure effectively reduces the required capacity of the storage buffers in the process of printing a color image according to the error diffusion technique.

In accordance with another preferable application, the printing head forms at least two different dots having different densities per unit area by at least two different inks having different densities, and the error diffusion technique is applied to at least one of the different dots formed by the different inks having different densities. In accordance with still another preferable application, the printing head forms at least two different dots in diameter, and the error diffusion technique is applied to at least one of the different dots. These structures also reduce the required capacity of the storage buffers.

The printing head may have a mechanism for discharging ink particles under a pressure applied to each ink running through an ink conduit by application of a voltage to a piezoelectric element arranged in the ink conduit, or a mechanism for discharging ink particles under a pressure applied to each ink running through an ink conduit by air bubbles that are produced by a supply of electricity to a heating body arranged in the ink conduit.

The present invention includes a variety of other applications. A first possible application is arrangement of one or a plurality of means selected among the input means, the diffused error registration means, the dot formation determination means, the density error computing means, the error distribution determination means, and the storage control means in an output device of images to be printed, instead of in the casing of a printing system. The dot formation determination means and the density error computing means may be realized by discrete circuits or by software in an arithmetic and logic circuit including a CPU. In the latter case, the output device of images to be printed, such as a computer, carries out the processing related to formation of dots. Only a mechanism for regulating discharge of inks from the printing head and recording the dots on paper may be arranged in the casing of the printing system. In accordance with another possible application, these means are divided into two groups, and one group is realized in the casing of the printing system, whereas the other group is realized in the output device of images to be printed.

A second possible application is a recording medium, on which software loaded and executed by a computer system is recorded. At least part of the input means and the dot formation determination means is realized by an arithmetic and logic circuit including a CPU (hardware) and software programs executed on the hardware. At least part of such software programs is recorded on the recording medium. The programs recorded on the recording medium preferably do not include a program for controlling the print head but are image conversion programs for converting a multi-tone image to an image whose tone is expressed by the distribution of dots.

One example of such application is a first recording medium for storing at least part of computer program code means in a computer readable form, the computer program code means causing a computer to store a cumulative error allocated to each pixel according to an error diffusion technique into each of a plurality of storage buffers and to convert the tone of an original image into a distribution of dots by the error diffusion technique based on the cumulative errors, the storage buffers having a total capacity corresponding to a number of pixels included in only one scanning line, the computer program code means including:
first program code means for causing the computer to compute corrected tone data with respect to a target pixel in the original image that is subjected to determination of formation or non-formation of a dot, based on tone information of print data regarding the target pixel and the cumulative error regarding the target pixel and being registered in a storage buffer corresponding to the target pixel;
second program code means for causing the computer to calculate a difference between a printing density corresponding to the corrected tone data and a printing density realized by formation or non-formation of a dot as a density error;
third program code means for causing the computer to determine distribution of the density error into non-processed peripheral pixels in the vicinity of the target pixel with predetermined weights; and
fourth program code means for causing the computer to store errors allocated to adjacent pixels after the target pixel on an identical scanning line in a primary scanning direction into storage buffers corresponding to the adjacent pixels after the target pixel and to store errors allocated to pixels existing on a next scanning line at positions corresponding to the target pixel and preceding pixels before the target pixel in the primary scanning direction into storage buffers corresponding to the target pixel and the preceding pixels before the target pixel, based on the distribution of the density error determined by the third program code means.

Another example of such application is a second recording medium for storing at least part of computer program code means in a computer readable form, the computer program code means causing a computer to store a cumulative error allocated to each pixel according to an error diffusion technique into each of a plurality of storage buffers and to convert the tone of an original image into a distribution of dots by the error diffusion technique based on the cumulative errors, the storage buffers having a total capacity corresponding to a number of pixels included in only one scanning line, the computer program code means including:
first program code means for causing the computer to determine whether or not a dot is formed in each pixel according to the error diffusion technique, based on tone information of print data regarding a target pixel in the original image, and the cumulative error regarding the target pixel and being registered in a storage buffer corresponding to the target pixel;

second program code means for causing the computer to calculate a difference between a printing density corresponding to the tone information regarding the target pixel and a printing density realized by formation or non-formation of a dot as a density error, based on the determination by the first program code means;

third program code means for causing the computer to determine distribution of the density error into peripheral pixels in the vicinity of the target pixel with predetermined weights, the peripheral pixels including pixels after the target pixel in a predetermined dot-forming direction and pixels in another direction that intersects the predetermined dot-forming direction; and fourth program code means for causing the computer to store errors allocated to the pixels in the another direction into storage buffers corresponding to pixels that have already been subjected to the determination by the first program code means.

A further application is a program server for supplying such software programs via a communication line.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
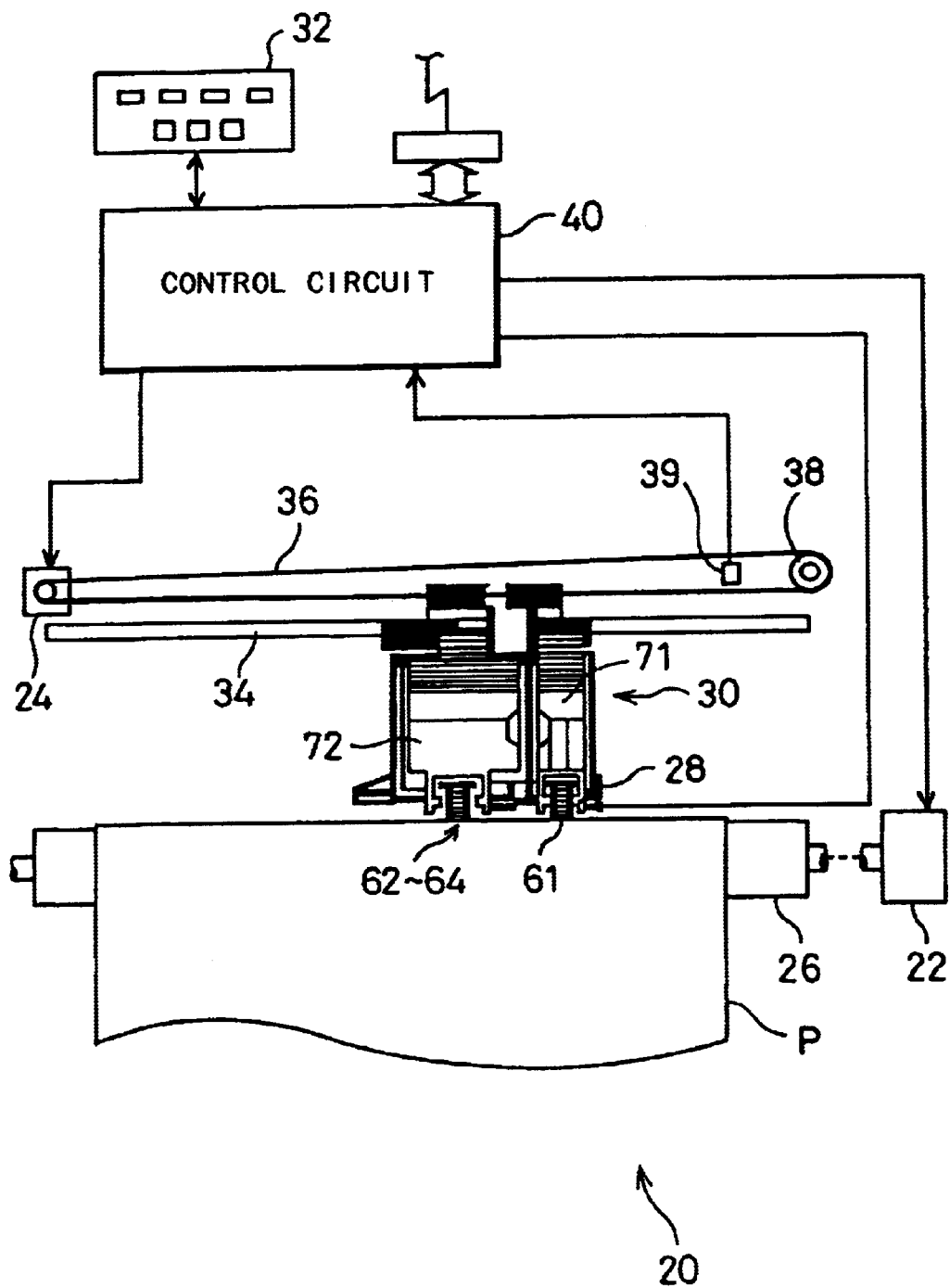
FIG. 1 schematically illustrates a printer 20 as an embodiment according to the present invention.

One mode of carrying out the present invention is discussed below as a preferred embodiment. FIG. 1 schematically illustrates a printer 20 as an embodiment according to the present invention. The printer 20 has a mechanism for feeding a sheet of paper P by means of a sheet feed motor 22, a mechanism for reciprocating a carriage 30 along the axis of a platen 26 by means of a carriage motor 24, a mechanism for driving a print head 28 mounted on the carriage 30 to control discharge of ink and production of dot patterns, and a control circuit 40 for transmitting signals to and from the sheet feed motor 22, the carriage motor 24, the print head 28, and a control panel 32.

The mechanism for feeding the sheet of paper P has a gear train (not shown) for transmitting rotations of the sheet feed motor 22 to the platen 26 as well as a sheet feed roller (not shown). The mechanism for reciprocating the carriage 30 includes a sliding shaft 34 arranged in parallel with the axis of the platen 26 for slidably supporting the carriage 30, a pulley 38, an endless drive belt 36 spanned between the carriage motor 24 and the pulley 38, and a position sensor 39 for detecting the position of the origin of the carriage 30.

Figure 2:
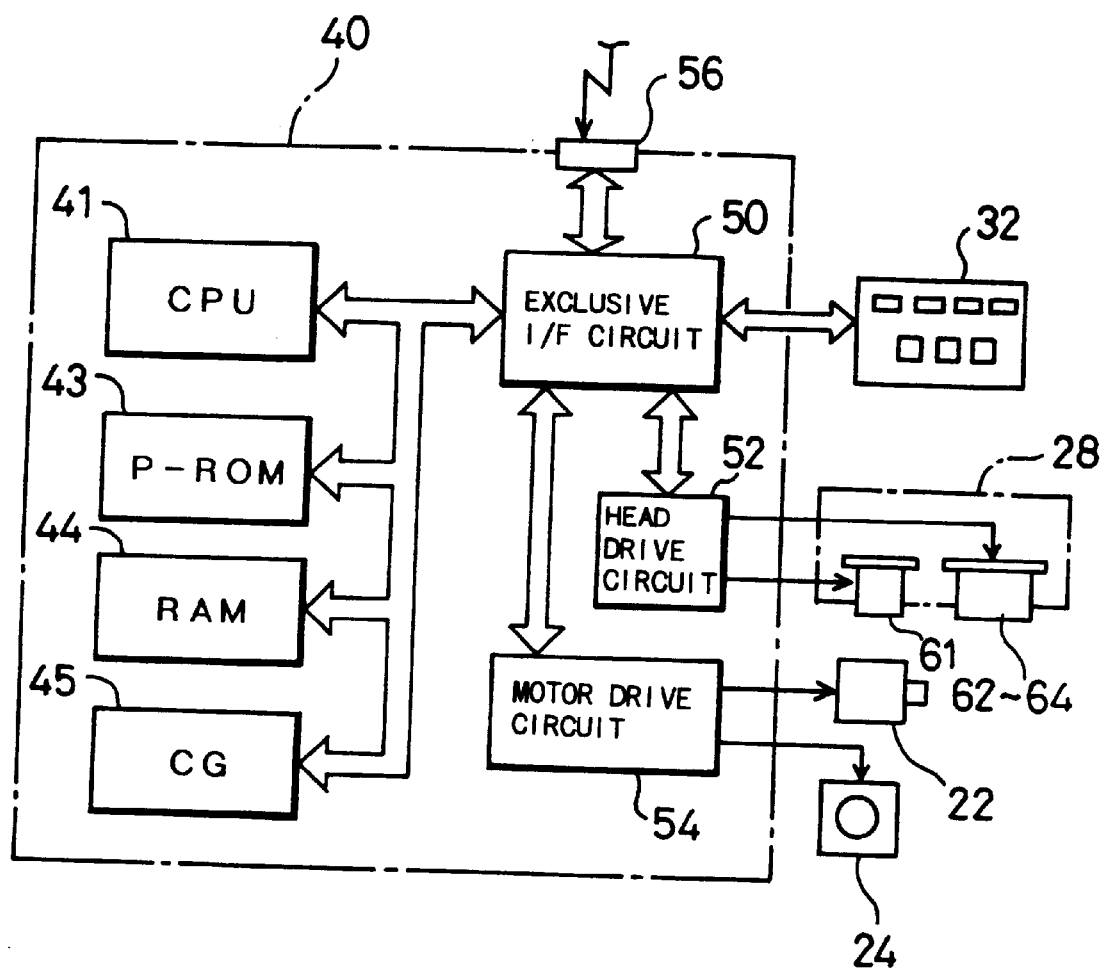
FIG. 2 is a block diagram illustrating structure of a control circuit 40 included in the printer 20.

The following describes the structure of the control circuit 40 and the peripheral units included in the printer 20. Referring to the block diagram of FIG. 2, the control circuit 40 is constructed as a known arithmetic and logic operation circuit including a CPU 41, a P-ROM 43 for storing programs, a RAM 44, and a character generator (CG) 45 for storing dot matrices of characters. The control circuit 40 further includes an exclusive I/F circuit 50 exclusively working as an interface to an external motor and the like, a head drive circuit 52 connected with the exclusive I/F circuit 50 for driving the print head 28, and a motor drive circuit 54 connected with the exclusive I/F circuit 50 for driving the sheet feed motor 22 and the carriage motor 24. The exclusive I/F circuit 50 includes a parallel interface circuit and is connected to a computer via a connector 56 to receive printing signals output from the computer. Output of image signals from the computer will be discussed later.

Figure 3:
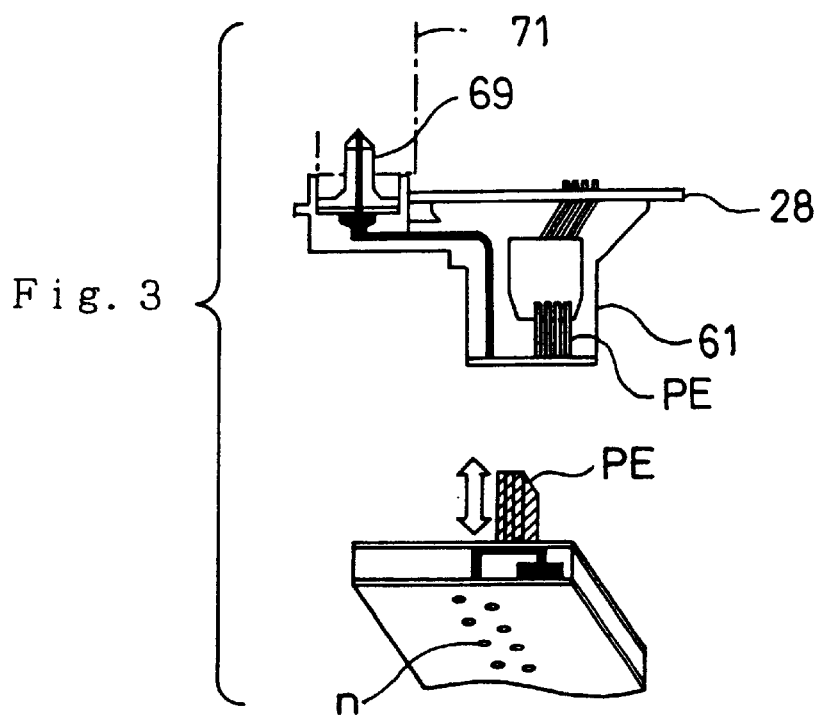
FIG. 3 shows a mechanism of spouting inks in each of color inks heads 61 through 64.

Referring back to FIG. 1, a black ink cartridge 71 and a color ink cartridge 72 for three different color inks, cyan, magenta, and yellow are attachable to the carriage 30. Four color ink heads 61 through 64 for respectively discharging inks are formed in the print head 28 that is disposed on the lower portion of the carriage 30. Ink supply pipes 69 for leading inks from ink tanks to the respective color ink heads 61 through 64 are formed upright on the bottom of the carriage 30 as shown in FIG. 3. When the black ink cartridge 71 and the color ink cartridge 72 are attached downward to the carriage 30, the ink supply pipes 69 are inserted into connection holes formed in the respective cartridges 71 and 72, so that inks are fed from the ink cartridges 71 and 72 to the respective color ink heads 61 through 64.

When the black ink cartridge 71 and the color ink cartridge 72 are attached to the carriage 30, inks in the ink cartridges 71 and 72 are sucked out by capillarity through the ink supply pipes 69 and are led to the color ink heads 61 through 64 formed in the print head 28 arranged on the lower portion of the carriage 30 as shown in FIG. 3. In the event of initial attachment of the ink cartridges 71 and 72, the respective inks are sucked into the corresponding color ink heads 61 through 64 by means of a pump, although the pump, a cap for covering the print head 28 during the sucking operation, and the other related elements are omitted from the illustration.

Figure 4:
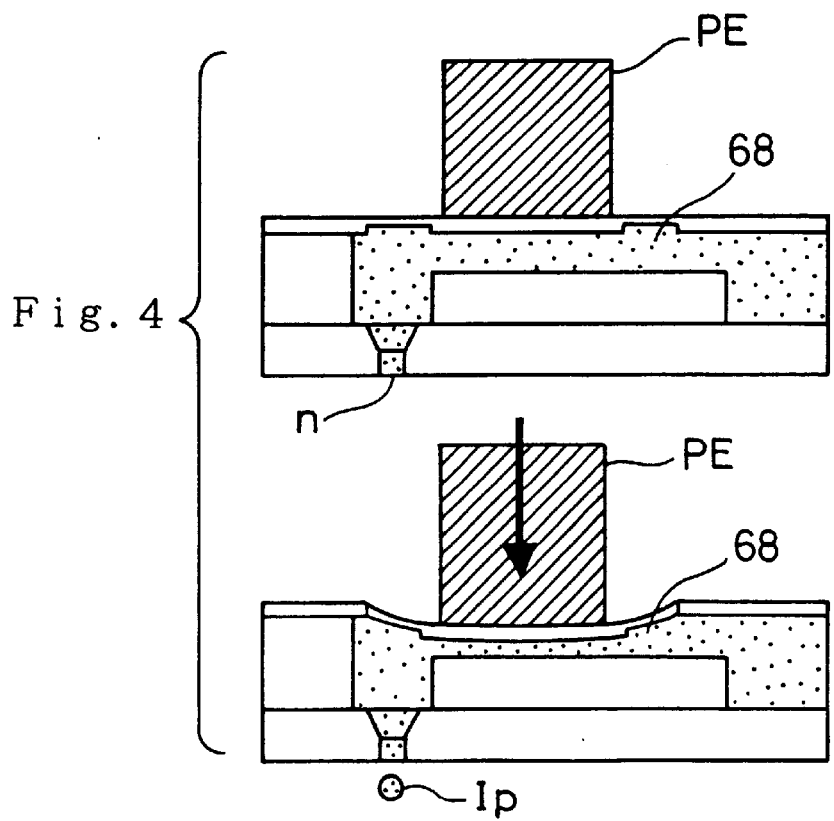
FIG. 4 shows a process of discharging ink particles Ip by extension of a piezoelectric element PE.

A row of nozzles 'n' are formed in each of the color ink heads 61 through 64 as shown in FIG. 3. In this embodiment, the number of nozzles for each color ink head is 32. A piezoelectric element PE is arranged for each row of nozzles 'n'. As is known, the piezoelectric element PE has a crystal structure undergoing mechanical stress by application of a voltage and thereby carries out extremely high-speed conversion of electrical energy to mechanical energy. FIG. 4 illustrates a configuration of the piezoelectric element PE and the nozzles 'n'. The piezoelectric element PE is disposed at a position that comes into contact with an ink conduit 68 for leading ink to the nozzles 'n'. In this embodiment, application of a voltage between electrodes on either ends of the piezoelectric element PE for a predetermined time period causes the piezoelectric element PE to abruptly extend and deform one side wall of the ink conduit 68 as shown in the lower drawing of FIG. 4. The volume of the ink conduit 68 is reduced with an extension of the piezoelectric element PE, and a certain amount of ink corresponding to the volume reduction is discharged as ink particles Ip from the ends of the nozzles 'n' with a high speed. The ink particles Ip soak into the sheet of paper P set on the platen 26, so as to print images.

Figure 5:
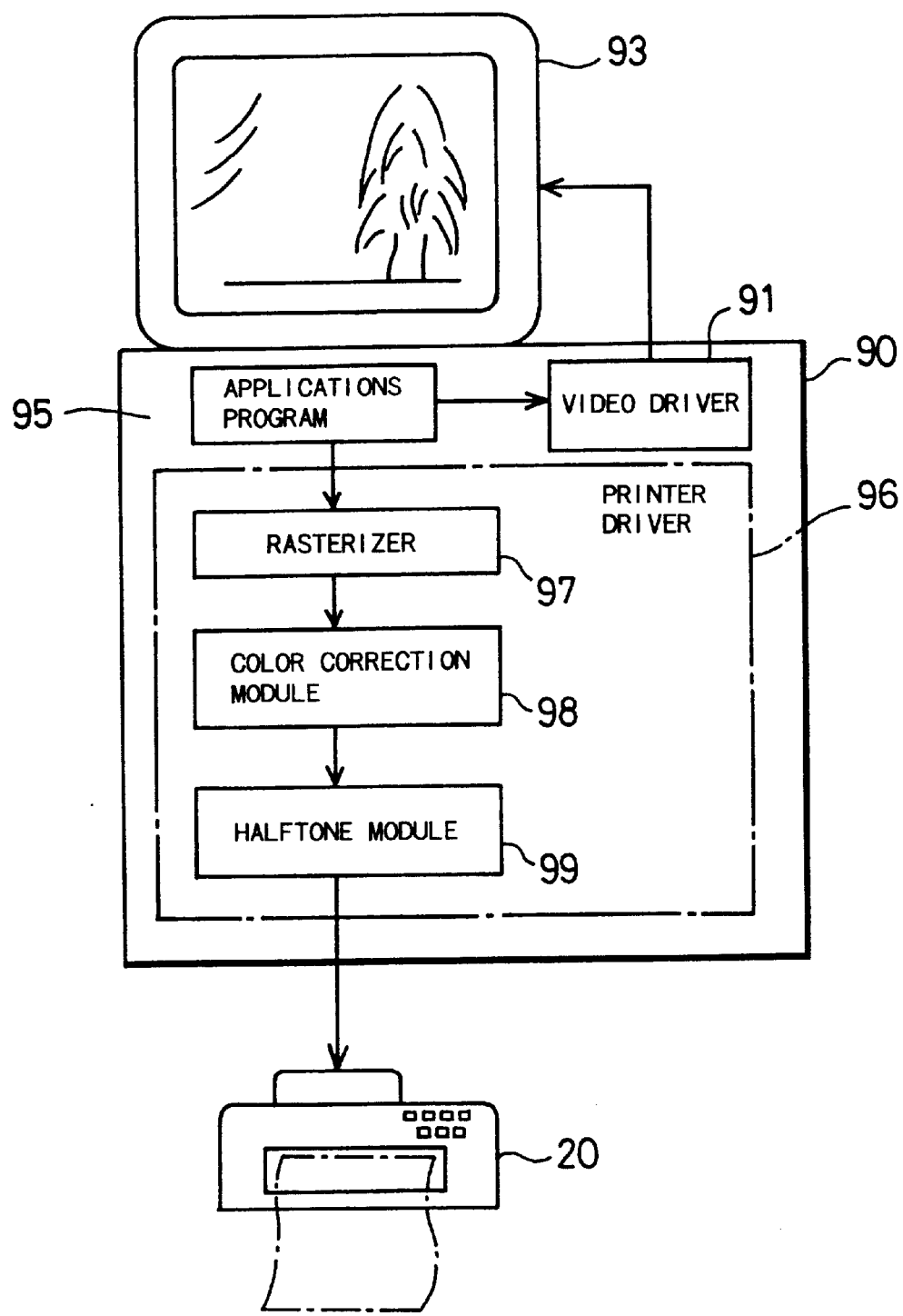
FIG. 5 is a block diagram showing a series of processes that enable a computer 90 to print images based on the input image information.

In the printer 20 of the embodiment having the hardware structure discussed above, while the sheet feed motor 22 rotates the platen 26 and the other rollers to feed the sheet of paper P, the carriage 30 is driven and reciprocated by the carriage motor 24 and the piezoelectric elements PE on the respective color ink heads 61 through 64 of the print head 28 are driven simultaneously. The printer 20 accordingly spouts the respective color inks and creates multi-color images onto the sheet of paper P. Referring to FIG. 5, the printer 20 prints multi-color images based on signals output from an image creating apparatus, such as a computer 90, via the connector 56. In this embodiment, an applications program 95 working in the computer 90 processes images and displays the processed images on a CRT display 93 via a video driver 91. When the applications program 95 outputs a printing instruction, a printer driver 96 in the computer 90 receives image information from the applications program 95 and the printer 20 converts the image information to printable signals. In the example of FIG. 5, the printer driver 96 includes a rasterizer 97 for converting the image information processed by the applications program 95 to dot-based color information, a color adjustment module 98 for making the image information that has been converted to the dot-based color information (tone data) undergo color adjustment according to the calorimetric characteristics of an image output apparatus, such as the printer 20, and a halftone module 99 for generating halftone image information, which expresses densities in a specified area by the existence or non-existence of ink in each dot unit, from the color-adjusted image information. Operations of these modules except the halftone module 99 are known to those skilled in the art nd are thus not specifically described here.

Figure 6:
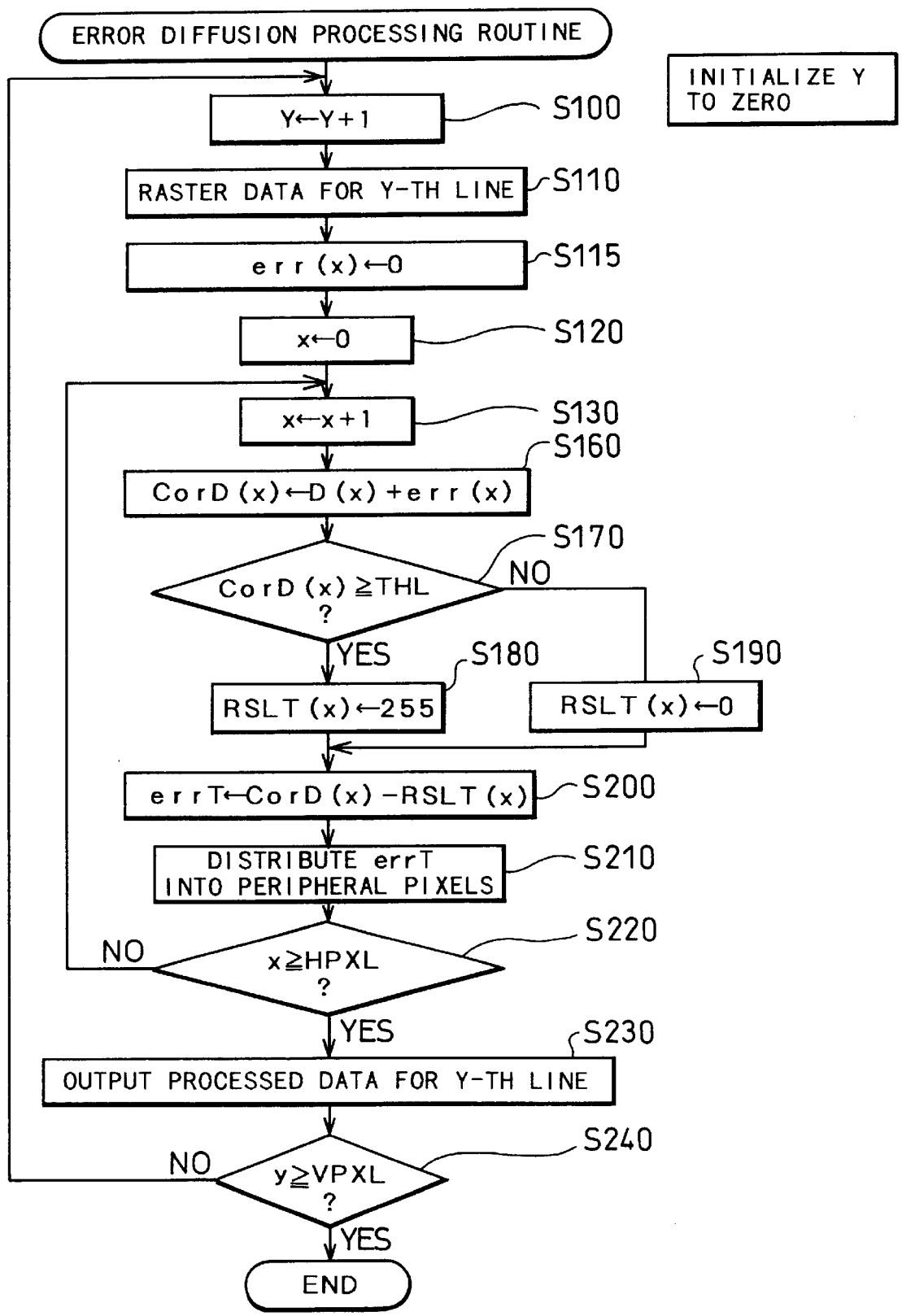
FIG. 6 is a flowchart showing an error diffusion processing routine carried out by the halftone module 99.

FIG. 6 is a flowchart showing a processing routine carried out by the halftone module 99. The printer 20 reciprocates its carriage 30 in the direction of width of the paper P (that is, in a primary scanning direction), while feeding the paper P in a direction perpendicular to the primary scanning direction (that is, in a secondary scanning direction), so as to create images successively. In the flowchart of FIG. 6, a variable Y denotes the line number in the secondary scanning direction from the start of the halftone processing (Y is an integer of 1 to VPXL, which represents the maximum number of lines to allow creation of images in the direction of length of paper), and a variable x denotes the dot number on each line from the start of the halftone processing (x is an inteer of 1 to HPXL, which represents the maximum number of dots to allow creation of images in the direction of width of paper). At the start of this processing routine, Y is initialized to zero.

When the program enters the routine of FIG. 6, the variable Y representing the line number to be subjected to the halftone processing is incremented by one at step S100. The program then goes to step S110 to read raster data of the Y-th line into an input data buffer D(x). The raster data of the Y-th line are input data converted to tone information of each pixel (8 bit-data for each pixel) by the rasterizer 97 and color-adjusted by the color adjustment module 98. In case that the paper P has the A4 size (width=210 millimeter) and the printing density is 720 dpi, the variable x ranges from 1 to 5952 (=HPXL).

After the storage of raster data corresponding to one line in the input data buffer D(X) at step S110, an error diffusion buffer err(x) is initialized to zero at step S115. The error diffusion buffer err(x) should be initialized to zero before binarization of images. The program then goes to step S120 to initialize the variable x representing the dot number to zero, to step S130 to increment the variable x by one, and to step S160 to add the distributed density error err(x) obtained by the error diffusion technique discussed below to the input data D(x) of the x-th dot, thereby yielding corrected data CorD(x).

After the calculation of the corrected data CorD(x), the corrected data CorD(x) is compared with a predetermined threshold value THL at step S170. The threshold value THL may be a median of density (127 in the case of 8-bit tone information) or any value correlated to the input data. In case that the corrected data CorD(x) is not less than the threshold value THL, the value '255' is set to a resulting value RSLT(x) of the x-th pixel at step S180. In case that the corrected data CorD(x) is less than the threshold value THL, on the other hand, the value '0' is set to the resulting value RSLT(x) at step S190. In this specification, an area in which the resulting value RSLT(x) is stored is referred to as a resulting value buffer.

Figure 7:
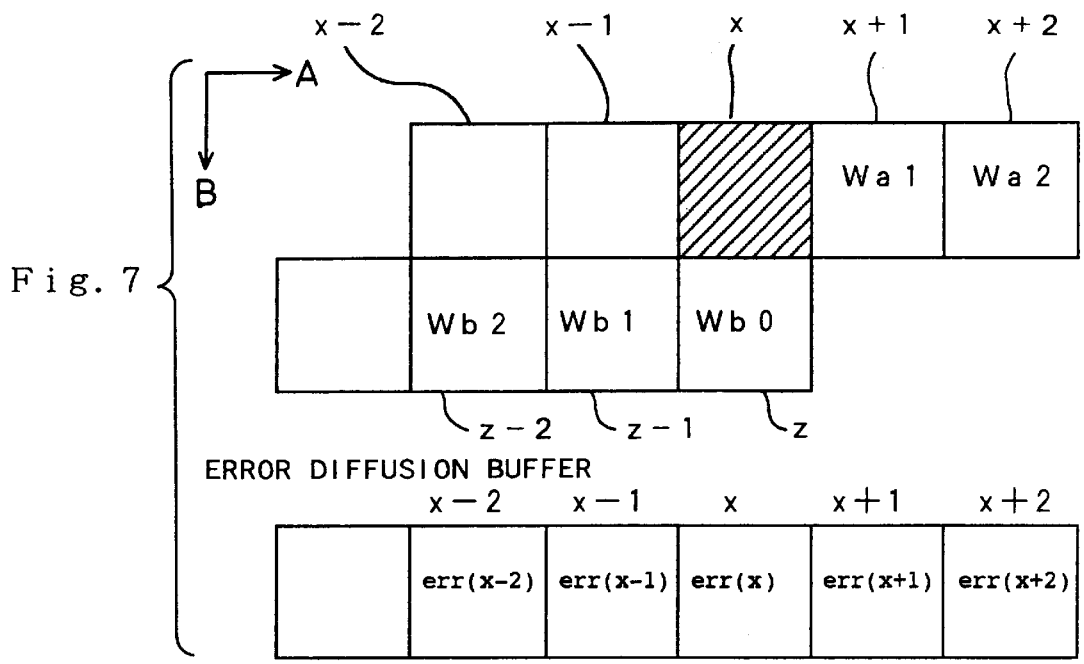
FIG. 7 shows a process of error diffusion applied in the embodiment.

After the determination of the resulting value RSLT(x), at step S200, a density error errT with respect to the pixel x is calculated by subtracting the resulting value RSLT(x) from the corrected data CorD(x) regarding the pixel x. The halftone processing causes each pixel to be either in black (density=255) or in white (density=0). In most cases, a density error accordingly exists between the resulting value RSLT(x) and the corrected data CorD(x). At subsequent step S210, the density error errT thus obtained is distributed into peripheral pixels with predetermined weights. In the process of distributing the density error errT into the peripheral pixels, the range of distribution may be differed according to the requirements. In this embodiment, as shown in FIG. 7, the density error errT is distributed into the peripheral pixels around a target pixel x with predetermined weights; into a pixel (x+1) adjoining to the target pixel x in a primary scanning direction A with a weight Wa1, a further adjoining pixel (x+2) with a weight Wa2, a pixel (z) adjoining to the target pixel x in a secondary scanning direction B with a weight Wb0, a pixel (z−1) prior to the pixel z in the primary scanning direction A with a weight Wb1, and a pixel (z−2) further prior to the pixel (z−1) with a weight Wb2. The distributed density errors are stored as follows in the error diffusion buffers err(x):

err(x+2)=err(x+2)+Wa2·errT
err(x+1)=err(x+1)+Wa1·errT
err(x)=Wb0·errT
err(x−1)=err(x−1)+Wb1·errT
err(x−2)=err(x−2)+Wb2·errT Before this cycle of the halftone processing is carried out, the cumulative density error err(x) regarding the pixel x (see step S160 in the flowchart of FIG. 6) has been stored in the error diffusion buffer, to which the density error Wb0·errT regarding the pixel z is newly allocated through this cycle of the halftone processing. The newly distributed density errors are allocated to the used error diffusion buffers in this manner. The density errors regarding the preceding pixels (x−1) and (x−2) have already been allocated to the error diffusion buffers regarding the pixels (z−1) and (z−2), and the newly distributed density errors with weights are added to these error diffusion buffers.

Referring back to the flowchart of FIG. 6, it is determined whether or not the target pixel x has reached the end of one line at step S220. When the target pixel x has not yet reached the end of one line, the program returns to step S130 to increment the target pixel x by one in the primary scanning direction and repeats the processing of steps S140 through S220. When the halftone processing has been concluded for one line, either formation of dot (corresponding to the value '255') or non-formation of dot (corresponding to the value '0') is registered in the resulting value buffers RSLT(1) through RSLT(HPXL), which are output to the printer 20 at step S230. The printer 20 receives the output and drives the color ink heads 61 through 64 to form dots on the paper P.

The halftone module 99 then determines whether or not the variable Y is not less than the maximum VPXL at step S240, in order to determine whether or not the line that is subjected to the halftone processing has reached the end of the paper P. In case that the variable Y has not yet reached the maximum VPXL, the program returns to step S10 to increment the line that is subjected to the halftone processing by one and repeats the processing of step S110 through S240. When the halftone processing has been concluded for the whole paper P, the program goes to END and exits from this routine.

As discussed above, the error diffusion processing routine of the embodiment requires a smaller number of error diffusion buffers, which is identical with the number of pixels included in one line that is subjected to the halftone processing, whereas the prior art technique requires a greater number of error diffusion buffers corresponding to two lines. This structure significantly reduces the total capacity of the error diffusion buffers. The halftone processing of this embodiment uses the error diffusion buffers only for one line, whereas the prior art technique uses the error diffusion buffers for two lines. The structure of the embodiment can thus avoid the confusion in the event of interruption of the halftone processing or in the event of the halftone processing for each area. By way of example, when the halftone processing is carried out for the respective areas classified by the objects, the variable x is varied in a specific area where an object exists, instead of in the range of 1 to HPXL. In this case, the values of the error diffusion buffers corresponding to the pixels out of the specific area are kept unchanged, and are thus not affected by the interruption and resumption of the halftone processing. This structure also facilitates the variation in technique of halftone processing for each area, for example, changing the weights in each area.

Figure 8A:
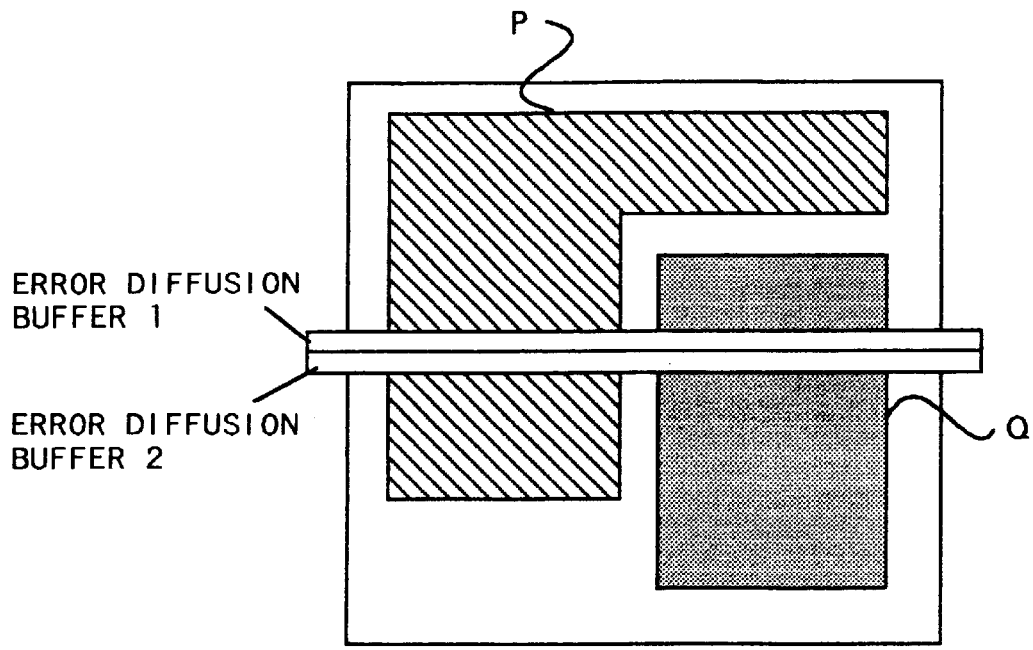
FIGS. 8A and 8B show the halftone processing of two areas in the prior art technique and the structure of the embodiment.
Figure 8B:
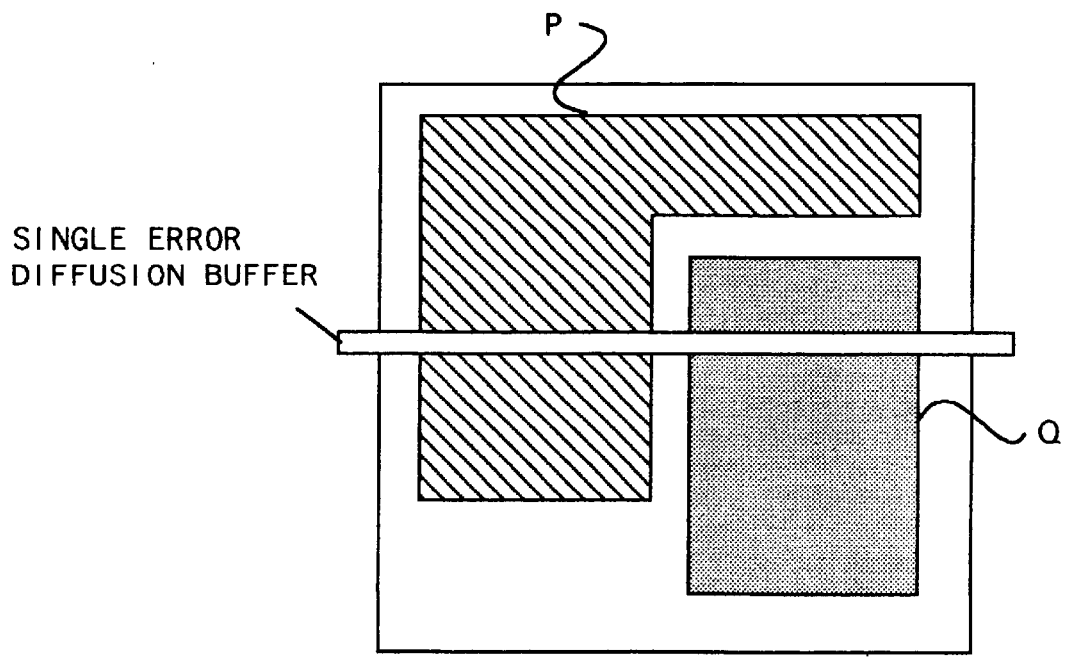

FIGS. 8A and 8B respectively illustrate processes of binarizing two areas where objects P and Q exist respectively. In the prior art structure with two available line error diffusion buffers as shown in FIG. 8A, the selection of one line error diffusion buffer for binarization of the area P does not determine which line error diffusion buffer should be selected for the subsequent binarization of the area Q. The prior art structure accordingly requires the pointer for controlling the selection of the line error diffusion buffer. In the structure of this embodiment with only one line error diffusion buffer as shown in FIG. 8B, on the other hand, when the binarization has been concluded for one line, the contents of the error diffusion buffer are automatically changed for a next line. This structure accordingly does not require any specific operation for switching the error diffusion buffer. This advantage is effective, for example, when different areas are processed by different tasks in an apparently simultaneous manner under a multitasking OS.

Figure 9:
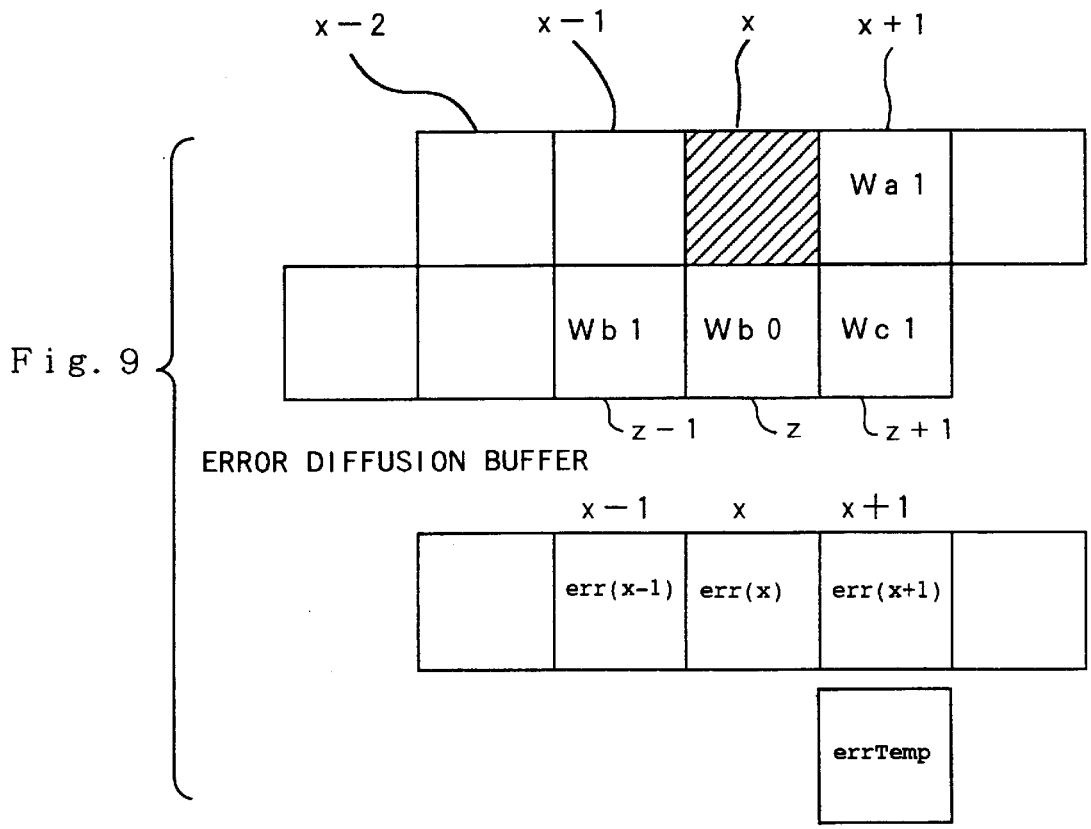
FIG. 9 shows another example of error diffusion in a narrower range.

In the embodiment discussed above, the density error errT is distributed into the two adjoining pixels (x+1) and (x+2) to the target pixel x in the primary scanning direction, the pixel z adjoining to the target pixel x in the secondary scanning direction, and its preceding pixels (z−1) and (z−2) with predetermined weights. In accordance with another possible application, distribution of the density error errT may be allocated to the pixel (z+1) adjoining to the pixel z in the primary scanning direction, instead of the pixels (x+2) and (z−2), as shown in FIG. 9. In this case, distribution of the density error is determined as follows, wherein Wc1 denotes a weight added to the pixel (z+1):

err(x+1)=err(x+1)+Wa1·errT
err(x)=errTemp+Wb0·errT
err(x−1)=err(x−1)+Wb1·errT
errTemp=Wc1·errT This structure requires a one-byte temporary memory errTemp in addition to the one-line error diffusion buffer.

Figure 10:
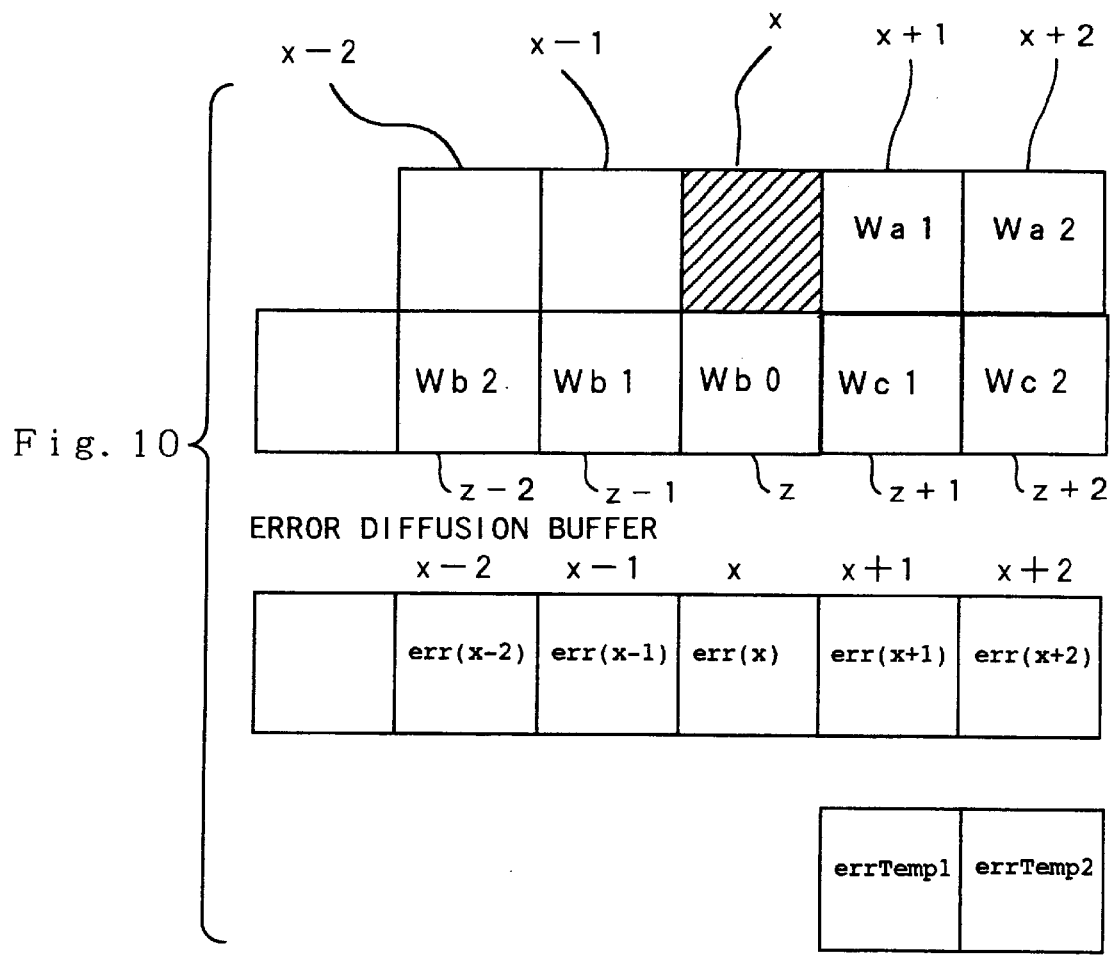
FIG. 10 shows still another example of error diffusion in a wider range.

In accordance with still another possible application, the density error errT may be distributed into the peripheral seven pixels including the pixels (z+1) and (z+2) as shown in FIG. 10. In this case, distribution of the density error is determined as follows, wherein Wc1 denotes a weight added to the pixel (z+1) and Wc2 a weight added to the pixel (z+2):

err(x+2)=err(x+2)+Wa2·errT
err(x+1)=err(x+1)+Wa1·errT
err(x)=errTemp1+Wb0·errT
err(x−1)=err(x−1)+Wb1·errT
err(x−2)=err(x−2)+Wb2·errT
errTemp1=errTemp2+Wc1·errT
errTemp2=Wc2·errT This structure requires two one-byte temporary memories errTemp1 and errTemp2 in addition to the one-line error diffusion buffer.

The above discussion does not specifically refer to the processing on the ends of each line. Several techniques may be applicable to the processing of pixels in the vicinity of a starting end or a terminal end of each line. One available technique changes the range of error diffusion in the vicinity of both ends of each line and allocates the distributed errors to somewhere on the image. Another technique sets margins including a required number of pixels on both ends of the error diffusion buffer and discards the errors allocated to these margins. In the range of error diffusion shown in FIG. 7, for example, the margins on either ends include two pixels. The number of pixels expanded on both ends of the error diffusion buffer is insignificant and practically negligible, compared with the total number of pixels included in the whole image. Still another technique applies a specific arithmetic operation for the error diffusion on both ends of each line.

Although the range of error diffusion is fixed in the above embodiment, the range of error diffusion, that is, the range of pixels into which the error is distributed, may be varied according to the tone information of input data. By way of example, in case that dots are not formed, the range of error diffusion is narrowed for the smaller input data and widened for the greater input data. In case that dots are formed, on the contrary, the range of error diffusion is widened for the smaller input data and narrowed for the greater input data. This structure effectively prevents the unevenness due to error diffusion and the appearance of repeated patterns, thereby enabling the resulting image to have extremely high quality.

In the embodiment discuss ed above, the halftone module 99 independently carries out the halftone processing for the respective colors, black, cyan, magenta, and yellow. The halftone module 99 may, however, carry out the halftone processing by taking into account the correlation of the respective colors. The halftone processing of the embodiment may be applicable to the printing system that is provided with six color ink heads including light cyan ink and light magenta ink having lower densities than those of cyan ink and magenta ink and cancels out the density error due to formation of dots by the distribution of dots having the lower densities. In this structure, the halftone module 99 determines the on/off state of deep dots formed by the higher-density ink based on input data including tone information, and subsequently adds a cumulative density error distributed from the processed peripheral pixels to input data regarding a target pixel so as to yield corrected data CorD(x) with respect to the target pixel. Only in case that the deep dots are not formed, the halftone module 99 determines the on/off state of light dots formed by the lower-density ink through comparison of the corrected data CorD(x) with a threshold value, distributes a density error err thus obtained into the peripheral pixels with predetermined weights, and stores the distributed errors into the error diffusion buffers for the processing of subsequent pixels.

This modified structure significantly reduces the total capacity of the error diffusion buffers in the printer for creating dots with inks of two different densities. The dots formed by the lower-density ink are inconspicuous, so that the resulting image has the lower degree of granularity.

In this modified structure, two different dots having different densities per unit area are formed by the two inks of the same color but different densities. In accordance with one possible application, three or more inks of the same color but different densities may be applied to this modified structure. In this case, the ratio of dye densities of these inks may be specified like a geometric series (1:n:2×n: . . . ) or as a relationship of like powers $(1:n^2:n^4 \ldots)$, wherein n=2,3, . . . (positive integer of not smaller than 2). As another modification, determination of the on/off state of light dots may be carried out prior to determination of the on/off state of deep dots. The principle of the present invention is also applicable to another modified structure, which forms two or more different dots in diameter with the same ink of a fixed density and carries out the error diffusion for one type of dots. The size of dots formed on the paper P is controlled by regulating the diameter of nozzles for discharging inks and the intensity of voltage pulses (that is, the voltage and duration) applied to the piezoelectric elements PE.

In the above embodiment and its modified examples, the halftone module 99 is included in the printer driver 96 of the computer 90. The halftone module 99 may, however, be included in the printer 20. In the latter case, the computer 90 transfers image information written in a language like PostScript to the printer 20 that has the halftone module 99 and the other related elements. In the embodiment, the software programs realizing a variety of functions are stored, for example, in a hard disk of the computer 90 and incorporated into the operating system in the form of the printer driver at the time of activation of the computer 90. In accordance with another possible application, the software programs may be stored in portable storage media (carriable storage media), such as floppy disks and CD-ROMs, and transferred from the storage media to the main memory of the computer 90 or an external storage device. As another example, the software programs maybe transferred from the computer 90 to the printer 20. In accordance with still another application, the contents of the halftone module 99 may be transferred from a server for supplying these software programs to either the computer 90 or the printer 20 via a communication line.

Figure 13:
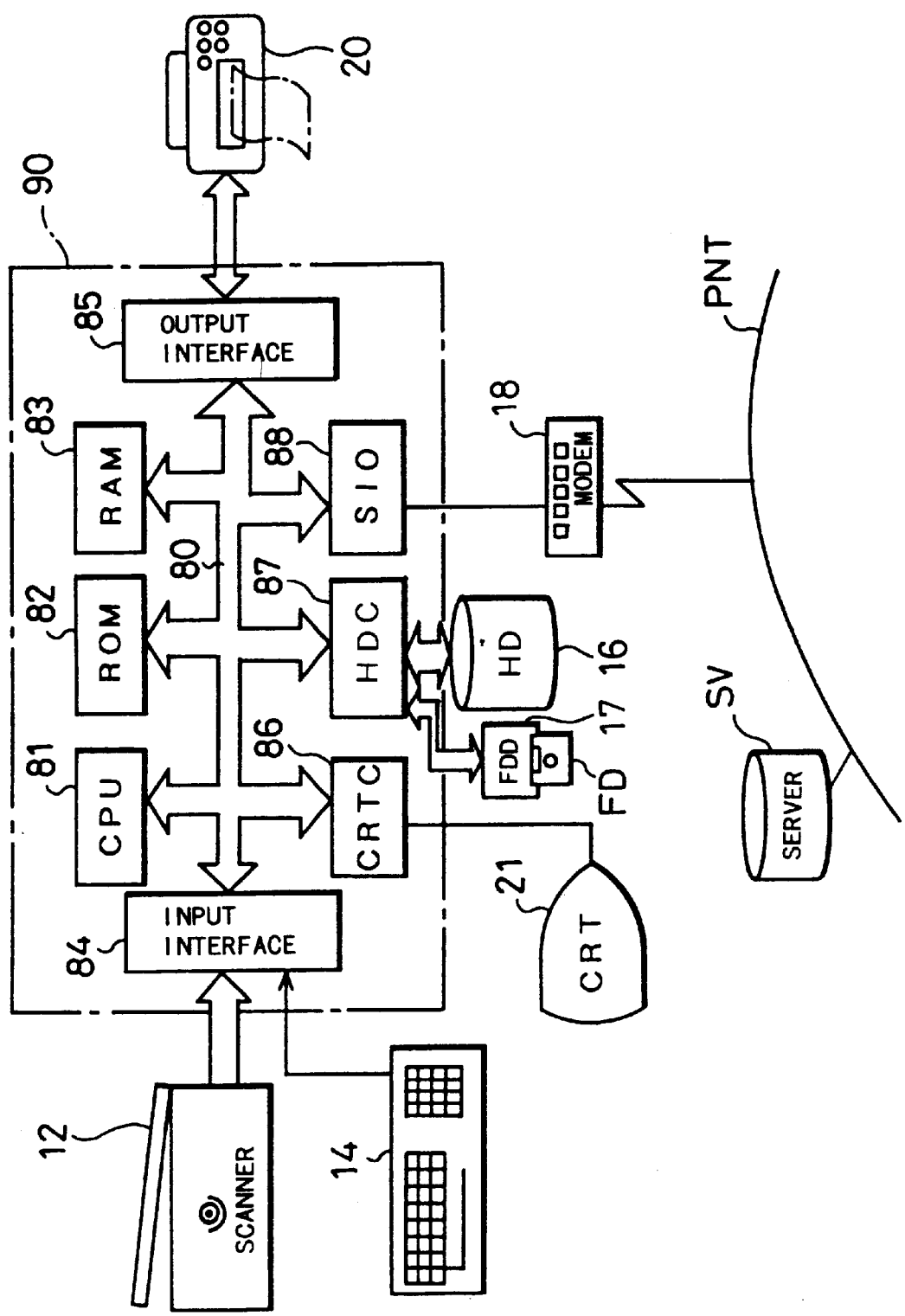
FIG. 13 is a block diagram illustrating structure of the computer 90 that carries out programs for converting multi-tone images and outputs the dot on/off signals to the printer 20.

The computer 90 may have an internal structure as shown in the block diagram of FIG. 13. The computer 90 includes a CPU 81, which executes a variety of arithmetic and logic operations according to programs in order to control the actions relating to image processing, and peripheral units mutually connected to one another via a bus 80. A ROM 82 stores programs and data required for execution of the variety of arithmetic and logic operations by the CPU 81. A RAM 83 is a memory, which various programs and data required for execution of the variety of arithmetic and logic operations by the CPU 81 are temporarily read from and written in. An input interface 84 receives input signals from a scanner 12 and a keyboard 74, whereas an output interface 85 transfers output data to the printer 20. A CRTC 86 controls signal outputs to a CRT 21 that can display color images. A disk controller (DDC) 87 controls transmission of data from and to a hard disk (HD) 16, a flexible disk drive (FDD) 77, and a CD-ROM drive (not shown). The hard disk 16 stores a variety of programs that are loaded into the RAM 83 and executed, as well as other programs that are supplied in the form of a device driver. A serial input-output interface (SIO) 88 is also connected to the bus 80. The SIO 88 is connected to a public telephone network PNT via a modem 18. The computer 90 is connected with an external network via the SIO 88 and the modem 18, and can access a specific server SV in order to download the programs required for image processing into the hard disk 16. The computer 90 may alternatively execute the required programs loaded from a flexible disk FD or a CD-ROM.

The programs executed in the above embodiment may be recorded on recording media, such as flexible disks and CD-ROMs. The computer 90 reads these programs via the flexible disk drive 77 or the CD-ROM drive, thereby realizing the image recording method discussed above.

In the above embodiment a predetermined voltage is applied to the piezoelectric elements PE for a predetermined time period for spout of inks. Another method is, however, applicable to discharge inks. The available ink-discharge techniques can be classified into two types; that is, the method of separating ink particles from a continuous jet stream of ink and the on-demand method applied in the above embodiment. The former type includes a charge modulation method that separates droplets of ink from a jet stream of ink by means of charge modulation and a microdot method that utilizes finle satellite particles produced in the process of separating large-diametral particles from a jet stream of ink. These methods are also applicable to the printing system of the present invention.

Figure 11:
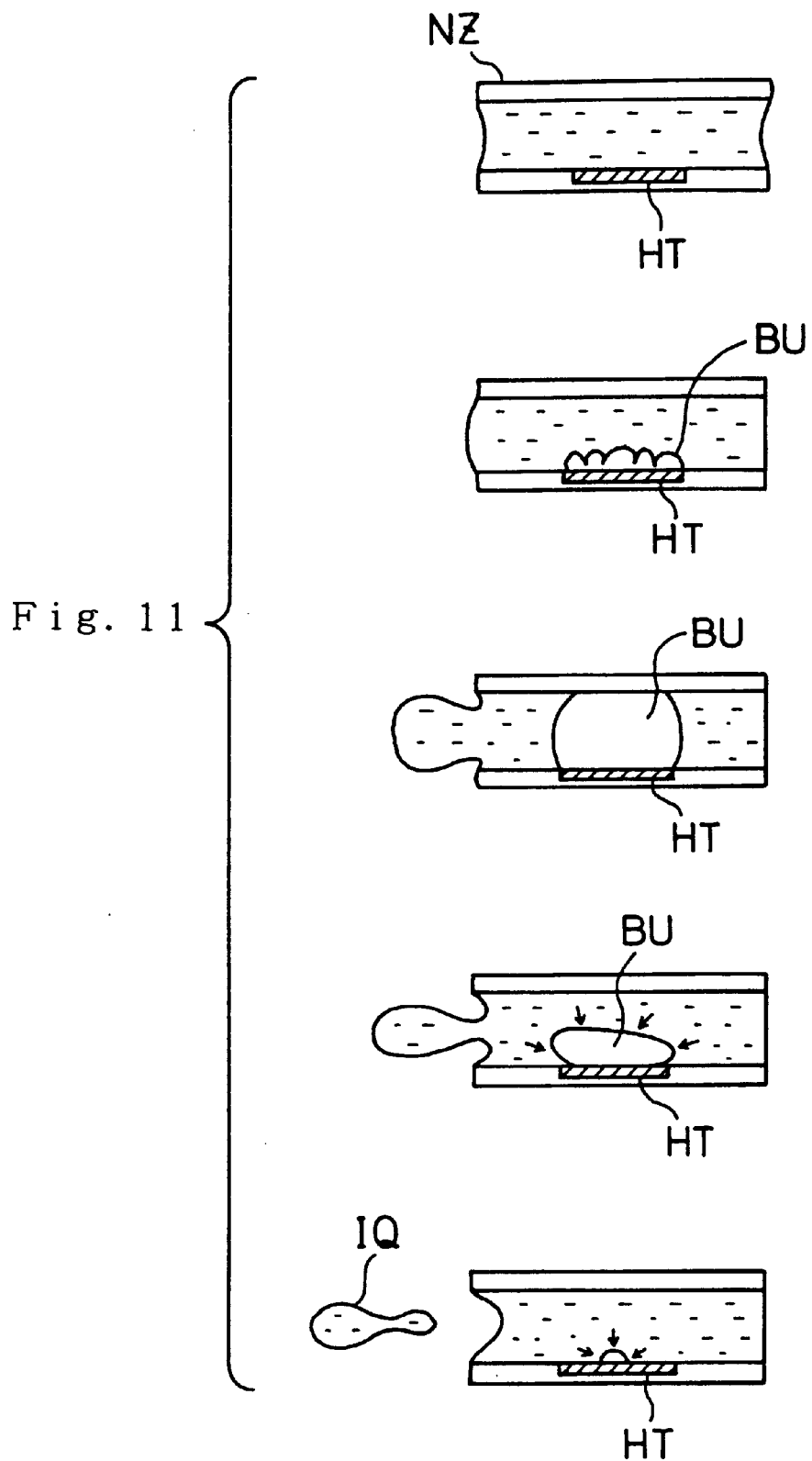
FIG. 11 shows another mechanism for discharging ink particles.
Figure 12:
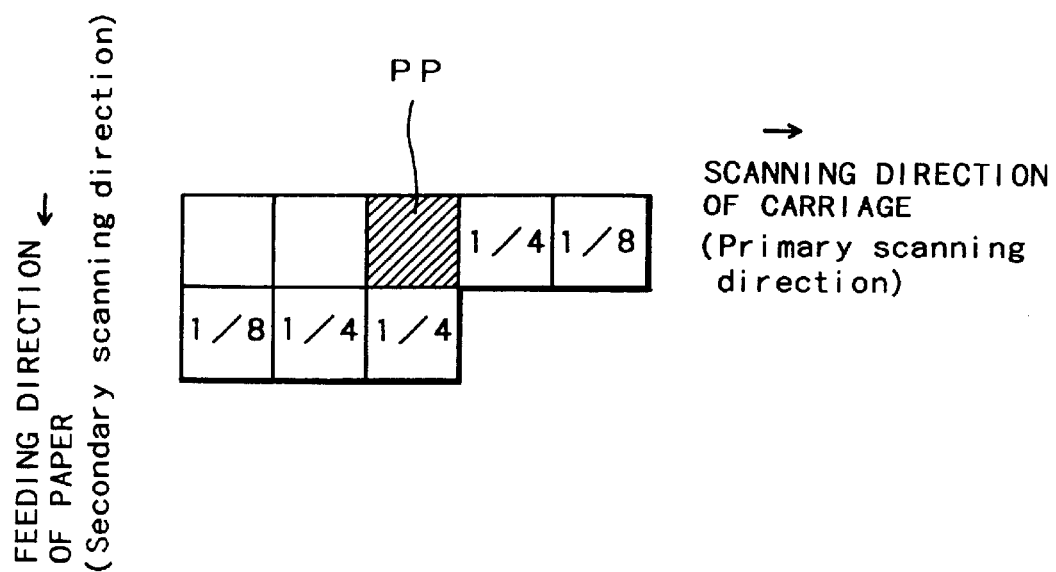
FIG. 12 shows weights of error diffusion in the prior art halftone processing.

The on-demand type, on the other hand, produces ink particles for the respective dot units according to the requirements. One available method included in the on-demand type, other than the method utilizing the piezoelectric elements applied in the above embodiment, disposes a heating body HT in the vicinity of a nozzle NZ of ink, produces bubbles BU by heating ink, and makes ink particles IQ discharged by the pressure of the bubbles BU as shown in FIG. 11. Such on-demand type methods are also applicable to the printing system of the present invention.

Although the above embodiment discusses the printer that is operable alone as the printing system, the principle of the present invention may be applicable to any printing systems incorporated in a variety of apparatuses, such as digital copying machines and facsimiles. The principle of the present invention is also applicable to any printing systems that record images by dots, for example, thermal transfer printers, thermal sublimation printers, and color laser printers, other than the ink jet printers as discussed in the above embodiment. The principle of the present invention is further applicable to digital cameras which do not generally have a memory of large capacity. In this case, an image subjected to the halftone processing in the digital camera is directly output from the digital camera to the printer. In the prior art structure that requires a large capacity of error diffusion buffers, on the other hand, the image can not be output directly from the digital camera to the printer.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A printing system with a printing head that successively forms dots along scanning lines in a predetermined scanning direction on a printing object and records an image through a distribution of dots based on an error diffusion technique, said printing system comprising:

input means for inputting print data including tone information regarding an image to be recorded by a pixel unit;

a single line buffer storage having a plurality of storage areas and a total capacity to a number of pixels included in only one scanning line, each said storage area storing a sufficient to store only a cumulative error of pixels in a single scanning line, the cumulative error allocated to each pixel according to the error diffusion technique;

diffused error registration means for registering said cumulative error into each of said storage area;

corrected tone data computing mean s for computing corrected tone data with respect to a target pixel that is subjected to determination of formation or non-formation of a dot, based on tone information of said print data regarding said target pixel and said cumulative error regarding said target pixel and being registered in a storage area corresponding to said target pixel;

density error computing means for calculating a difference between a printing density corresponding to said corrected tone data and a printing density realized by formation or non-formation of a dot as a density error;

error distribution determination means for determining distribution of said density error into non-processed peripheral pixels in the vicinity of said target pixel with predetermined weights;

storage control means for storing errors allocated to adjacent pixels following said target pixel on an identical scanning line in a primary scanning direction into storage areas of said single line buffer storage corresponding to said adjacent pixels following said target pixel, and storing errors allocated to pixels existing on a next scanning line at positions corresponding to said target pixel and preceding pixels before said target pixel in the primary scanning direction into storage areas said single line buffer storage corresponding to said target pixel and said preceding pixels before said target pixel, based on the distribution of said density error determined by said error distribution determination means; and updating means for clearing the error allocated to the target pixel and storing the error allocated to the pixel existing on the next scanning line at the position corresponding to the target pixel.

2. A printing system in accordance with claim 1, wherein said error distribution determination means comprises temporary storage means for temporarily storing errors with respect to at least one pixel existing on said next scanning line and being located after said targetpixel in the primary scanning direction.

3. A printing system in accordance with claim 1, wherein said printing head forms at least two different dots by at least two different inks having different hues, the error diffusion technique being applied to at least one of said different dots formed by said different inks having different hues.

4. A printing system in accordance with claim 1, wherein said printing head forms at least two different dots having different densities per unit area by at least two different inks having different densities, the error diffusion technique being applied to at least one of said different dots formed by said different inks having different densities.

5. A printing system in accordance with claim 1, wherein said printing head forms at least two different dots in diameter, the error diffusion technique being applied to at least one of said different dots.

6. A printing system in accordance with claim 1, wherein said printing head comprises a mechanism for discharging ink particles under a pressure applied o each ink running through an ink conduit by application of a voltage to a piezoelectric element arranged in said ink conduit.

7. A printing system in accordance with claim 1, wherein said printing head comprises a mechanism for discharging ink particles under a pressure applied to each ink running through an ink conduit by air bubbles that are produced by a supply of electricity to a heating body arranged in said ink conduit.

8. A printing system with a printing head that successively forms dots along scanning lines in a predetermined scanning direction on a printing object and records an image through a distribution of dots based on an error diffusion technique, said printing system comprising:

a single line buffer storage having a plurality of storage areas and a total capacity sufficient to store only a cumulative error of pixels in a single scanning line, the cumulative error allocated to each pixel according to the error diffusion technique;

input means for inputting print data including tone information regarding an image to be recorded by a pixel unit;

corrected tone data computing means for computing corrected tone data with respect to a target pixel that is subjected to determination of formation or non-formation of a dot, based on tone information of said print data regarding said target pixel and said cumulative error regarding said target pixel and being registered in a storage area of said single line buffer storage corresponding to said target pixel;

dot formation determination means for determining whether or not a dot is formed in each pixel according to the error diffusion technique, based on said corrected tone data;

density error computing means for calculating a difference between a printing density corresponding to said tone information and a printing density realized by formation or non-formation of a dot as a density error, based on the determination by said dot formation determination means;

error distribution determination means for determining distribution of said density error into peripheral pixels in the vicinity of said target pixel with predetermined weights, said peripheral pixels comprising pixels following said target pixel on an identical scanning line in a primary scanning direction and pixels existing on a next scanning line;

storage control means for clearing errors allocated to processed pixels that have already been subjected to the determination by said dot formation determination means, and then storing errors allocated to said pixels existing on said next scanning line into storage areas of said single line buffer storage corresponding to the processed pixels; and head driving means for driving said printing head to form dots, based on the determination by said dot formation determination means.

9. A printing system in accordance with claim 8, wherein said error distribution determination means comprises temporary storage means for temporarily storing errors with respect to at least one pixel existing on said next scanning line and being located after said target pixel in the primary scanning direction.

10. A printing system in accordance with claim 8, wherein said printing head forms at least two different dots by at least two different inks having different hues, the error diffusion technique being applied to at least one of said different dots formed by said different inks having different hues.

11. A printing system in accordance with claim 8, wherein said printing head forms at least two different dots having different densities per unit area by at least two different inks having different densities, the error diffusion technique being applied to at least one of said different dots formed by said different inks having different densities.

12. A printing system in accordance with claim 8, wherein said printing head forms at least two different dots in diameter, the error diffusion technique being applied to at least one of said different dots.

13. A printing system in accordance with claim 8, wherein said printing head comprises a mechanism for discharging ink particles under a pressure applied to each ink running through an ink conduit by application of a voltage to a piezoelectric element arranged in said ink conduit.

14. A printing system in accordance with claim 8, wherein said printing head comprises a mechanism for discharging ink particles under a pressure applied to each ink running through an ink conduit by air bubbles that are produced by a supply of electricity to a heating body arranged in said ink conduit.

15. In a printing system with a printing head that successively forms dots along scanning lines in a predetermined scanning direction on a printing object, a method of recording an image through a distribution of dots based on an error diffusion technique, said method comprising the steps of:

(a) inputting print data including tone information regarding an image to be recorded by a pixel unit;

(b) storing a cumulative error allocated to each pixel according to the error diffusion technique into each of a plurality of storage buffers forming a single line, said single line plurality of storage buffers having a total capacity sufficient to store only a cumulative error of pixels in a single scanning line;

(c) computing corrected tone data with respect to a target pixel that is subjected to determination of formation or non-formation of a dot, based on tone information of said print data regarding said target pixel and said cumulative error regarding said target pixel and being registered in a storage buffer corresponding to said target pixel;

(d) calculating a difference between a printing density corresponding to said corrected tone data and a printing density realized by formation or non-formation of a dot as a density error;

(e) determining distribution of said density error into non-processed peripheral pixels in the vicinity of said target pixel with predetermined weights;

(f) clearing errors allocated to processed pixels that have already been subjected to the determination in step (c);

(g) storing errors allocated to adjacent pixels following said target pixel on an identical scanning line in a primary scanning direction into storage buffers of said single line plurality of storage buffers and corresponding to said adjacent pixels following said target pixel, and storing errors allocated to pixels existing on a next scanning line at positions corresponding to said target pixel and preceding pixels before said target pixel in the primary scanning direction into storage buffers of said single line plurality of storage buffers and corresponding to said target pixel and said preceding pixels before said target pixel, based on the distribution of said density error determined in said step (e); and (h) clearing the error allocated to the target pixel and storing the error allocated to the pixel existing on the next scanning line at the position corresponding to the target pixel.

16. In a printing system with a printing head that successively forms dots in a predetermined direction on a printing object, a method of recording an image through a distribution of dots based on an error diffusion technique, said method comprising the steps of:

(a) storing a cumulative error allocated to each pixel according to the error diffusion technique into each of a plurality of storage buffers forming a single line, said single line plurality of storage buffers having a total capacity sufficient to store only a cumulative error of pixels in a single scanning line;

(b) inputting print data including tone information regarding an image to be recorded by a pixel unit;

(c) determining whether or not a dot is formed in each pixel according to the error diffusion technique, based on tone information of said print data regarding a target pixel and said cumulative error regarding said target pixel and being registered in a storage buffer of said single line plurality of storage buffers corresponding to said target pixel;

(d) calculating a difference between a printing density corresponding to said tone information regarding said target pixel and a printing density realized by formation or non-formation of a dot as a density error, based on the determination in said step (c);

(e) determining distribution of said density error into peripheral pixels in the vicinity of said target pixel with predetermined weights, said peripheral pixels comprising pixels following said target pixel in said predetermined direction and pixels in another direction that intersects said predetermined direction;

(f) clearing errors allocated to processed pixels that have already been subjected to the determination in said step (c);

(g) storing errors allocated to said pixels in said another direction into storage buffers of said single line plurality of storage buffers corresponding to the processed pixels; and (h) driving said printing head to form dots, based on the determination in said step (c).

17. A recording medium for storing at least part of computer program code means in a computer readable form, said computer program code means causing a computer to store a cumulative error allocated to each pixel according to an error diffusion technique into each of a plurality of storage buffers forming a single line and to convert the tone of an original image into a distribution of dots by the error diffusion technique based on said cumulative errors, said single line plurality of storage buffers having a total capacity sufficient to store only a cumulative error of pixels in a single scanning line, said computer program code means comprising:
first program code means for causing the computer to compute corrected tone data with respect to a target pixel in said original image that is subjected to determination of formation or non-formation of a dot, based on tone information of print data regarding said target pixel and said cumulative error regarding said target pixel and being registered in a storage buffer corresponding to said target pixel;
second program code means for causing the computer to calculate a difference between a printing density corresponding to said corrected tone data and a printing density realized by formation or non-formation of a dot as a density error;
third program code means for causing the computer to determine distribution of said density error into non-processed peripheral pixels in the vicinity of said target pixel with predetermined weights;
fourth program code means for causing the computer to store errors allocated to adjacent pixels following said target pixel on an identical scanning line in a primary scanning direction into storage buffers of said single line plurality of storage buffers corresponding to said adjacent pixels following said target pixel and to store errors allocated to pixels existing on a next scanning line at positions corresponding to said target pixel and preceding pixels before said target pixel in the primary scanning direction into storage buffers of said single line plurality of storage buffers corresponding to said target pixel and said preceding pixels before said target pixel, based on the distribution of said density error determined by said third program code means; and
fifth program code means for clearing the error allocated to the target pixel and storing the error allocated to the pixel existing on the next scanning line at the position corresponding to the target pixel.

18. A recording medium for storing at least part of computer program code means in a computer readable form, said computer program code means causing a computer to store a cumulative error allocated to each pixel according to an error diffusion technique into each of a plurality of storage buffers forming a single line and to convert the tone of an original image into a distribution of dots by the error diffusion technique based on said cumulative errors, said single line plurality of storage buffers having a total capacity sufficient to store only a cumulative error of pixels in a single scanning line, said computer program code means comprising:
first program code means for causing the computer to determine whether or not a dot is formed in each pixel according to the error diffusion technique, based on tone information of print data regarding a target pixel in said original image, and said cumulative error regarding said target pixel and being registered in a storage buffer corresponding to said target pixel;
second program code means for causing the computer to calculate a difference between a printing density corresponding to said tone information regarding said target pixel and a printing density realized by formation or non-formation of a dot as a density error, based on the determination by said first program code means;
third program code means for causing the computer to determine distribution of said density error into peripheral pixels in the vicinity of said target pixel with predetermined weights, said peripheral pixels comprising pixels following said target pixel in a predetermined dot-forming direction and pixels in another direction that intersects said predetermined dot-forming direction; and
fourth program code means for causing the computer to clear errors allocated to processed pixels that have already been subjected to the determination by said first program code means and to store errors allocated to said pixels in said another direction into storage buffers of said single line plurality of storage buffers corresponding to the processed pixels.

19. A printing system printing print data through a distribution of dots, the printing system comprising:

means for inputting the print data including tone information for an image to be recorded by a pixel unit;

a single line buffer storage having a total storage capacity sufficient to store only a cumulative error of pixels in a single scanning line;

means for computing corrected tone data with respect to a target pixel based on tone information of the print data for the target pixel and a cumulative error stored in a buffer storage of said single line buffer storage for the target pixel, wherein the target pixel is a subject pixel for determination of formation or non-formation of a dot;

means for calculating a difference between a printing density corresponding to the corrected tone data and a printing density realized by formation or non-formation of a dot as a density error;

means for determining distribution of the density error into non-processed peripheral pixels in the vicinity of the target pixel with predetermined weight; and means for updating a status of the buffer storage for the target pixel within the storage capacity corresponding to one scanning line so as to clear the cumulative error for the target pixel from the buffer storage for target pixel and then store the cumulative error for a new pixel corresponding to another line than a main scanning line and following the last stored pixel into the single line buffer storage.

20. A printing system printing print data through a distribution of dots, the printing system comprising:

means for inputting the print data including tone information for an image to be recorded by a pixel unit;

a single line buffer storage having a plurality of sections and a total storage capacity sufficient to store only a cumulative error of pixels in a single scanning line, wherein each section stores a cumulative error allocated to each pixel;

means for computing corrected tone data with respect to a target pixel based on tone information of the print data for the target pixel and the cumulative error for the target pixel, wherein the target pixel is a subject pixel for determination of formation or non-formation of a dot;

means for calculating a difference between a printing density corresponding to the corrected tone data and a printing density realized by formation or non-formation of a dot as a density error;

means for determining distribution of the density error into non-processed peripheral pixels in the vicinity of the target pixel with predetermined weight; and means for storing the cumulative errors into the single line buffer storage such that each cumulative error for each pixel from a first position following the target pixel on a current scanning line to a second position corresponding to the target pixel on a next scanning line is stored into each corresponding section of the single line buffer storage.

21. An image processing apparatus comprising:

means for inputting image data by a pixel unit, wherein the image data includes tone information for an image to be output;

a single line buffer storage having a plurality of sections and a total storage capacity sufficient to store only a cumulative error of pixels in a single scanning line, wherein each section stores a cumulative error allocated to each pixel;

means for computing corrected tone data with respect to a target pixel based on tone information of the image data for the target pixel and the cumulative error stored in the single line buffer storage for the target pixel, wherein the target pixel is a subject pixel for determination of formation or non-formation of a dot;

means for calculating a difference between an output density corresponding to the corrected tone data and an output density realized by formation or non-formation of a dot as a density error;

means for determining distribution of the density error into non-processed peripheral pixels in the vicinity of the target pixel with predetermined weight; and means for storing the cumulative errors into the single line buffer storage such that each cumulative error for each pixel from a first position following the target pixel on a current scanning line to a second position corresponding to the target pixel on a next scanning line is stored into each corresponding section of the single line buffer storage.

22. An image processing method comprising:

inputting image data by a pixel unit, wherein the image data includes tone information for an image to be output;

computing corrected tone data with respect to a target pixel based on tone information of the data for the target pixel and the cumulative error for the target pixel, wherein the target pixel is a subject pixel for determination of formation or non-formation of a dot;

calculating a difference between an output density corresponding to the corrected tone data and an output density realized by formation or non-formation of a dot as a density error;

determining distribution of the density error into non-processed peripheral pixels in the vicinity of the target pixel with predetermined weight; and storing the cumulative errors into a single line buffer storage such that each cumulative error for each pixel from a first position following the target pixel on a current scanning line to a second position corresponding to the target pixel on a next scanning line is stored into each corresponding section of the single line buffer storage, the single line buffer storage having a total capacity sufficient to store only a cumulative error of pixels in a single scanning line.

23. A computer readable medium storing a computer program to process an image, the computer program comprising:

first computer code means for inputting image data by a pixel unit, wherein the image data includes tone information for an image to be output;

second computer code means for computing corrected tone data with respect to a target pixel based on tone information of the data for the target pixel and the cumulative error for the target pixel, wherein the target pixel is a subject pixel for determination of formation or non-formation of a dot;

third computer code means for calculating a difference between an output density corresponding to the corrected tone data and an output density realized by formation or non-formation of a dot as a density error;

fourth computer code means for determining distribution of the density error into non-processed peripheral pixels in the vicinity of the target pixel with predetermined weight; and fifth computer code means for storing the cumulative errors into a single line buffer storage such that each cumulative error for each pixel from a first position following the target pixel on a current scanning line to a second position corresponding to the target pixel on a next scanning line is stored into each corresponding section of the single line buffer storage, the single line buffer storage having a total capacity sufficient to store only a cumulative error of pixels in a single scanning line.

* * * * *